J. P. McCANN.
Combination Digging Implement.
No. 208,749. Patented Oct. 8, 1878.
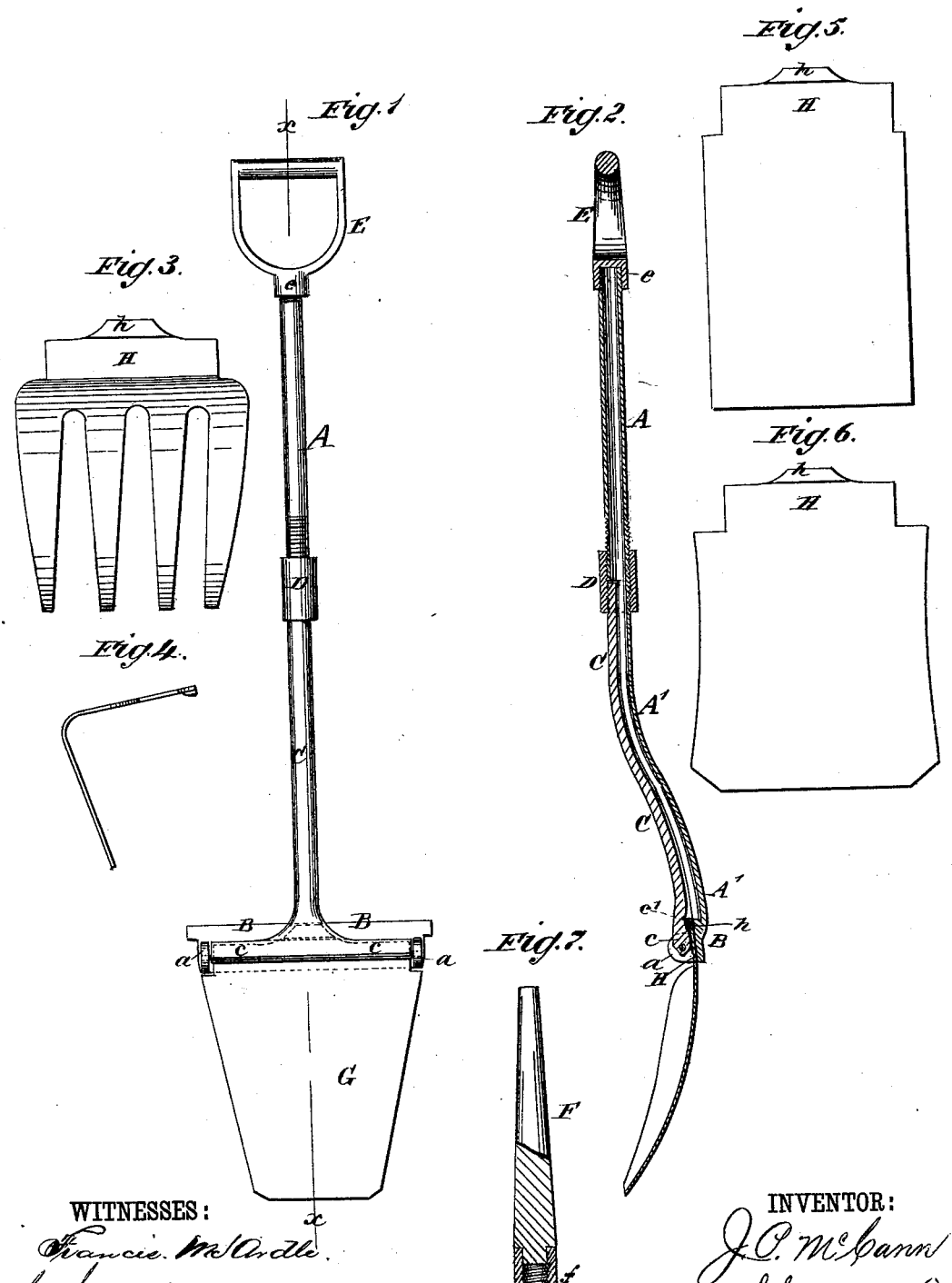
WITNESSES:
Francis McArdle
C. Sedgwick
INVENTOR:
J. P. McCann
BY Munn & Co
ATTORNEYS.

UNITED STATES PATENT OFFICE.

JAMES P. McCANN, OF WESSON, MISSISSIPPI.

IMPROVEMENT IN COMBINATION DIGGING IMPLEMENTS.

Specification forming part of Letters Patent No. 208,749, dated October 8, 1878; application filed April 29, 1878.

*To all whom it may concern:*

Be it known that I, JAMES PATRICK MCCANN, of Wesson, in the county of Copiah and State of Mississippi, have invented a new and Improved Combination Digging Implement, of which the following is a specification:

The object of my invention is to furnish a new and improved construction of digging-tools, by which different kinds of spades, shovels, forks, hooks, hoes, &c., may be interchanged upon the same handle, the latter by itself being available for use as a tamping-bar.

The invention will first be described in connection with the drawings, and then pointed out in the claim.

In the accompanying drawings, Figure 1 represents a front view of my improved digging implement when used as a spade. Fig. 2 is a longitudinal section of the same when used as a scoop-shovel, the section being taken on the line $x\, x$ of Fig. 1. Fig. 3 is a front view of a manure-fork blade. Fig. 4 is a side view of a hook or rake-blade. Fig. 5 is a front view of a square spade-blade, and Fig. 6 is a front view of a flat shovel-blade, all constructed so as to adapt them to be interchanged upon the same handle. Fig. 7 is a detail view of an extension to replace the bail on the upper end of the handle, in order to lengthen the latter, when required, in digging post-holes or other cavities inconveniently deep for access by the ordinary handle.

Similar letters of reference indicate corresponding parts.

A is a handle, made of iron pipe, bent in the shape of an ordinary spade-handle or shovel-handle. The lower part of the handle A is divided along its center line in line with the blade of the tool attached to it, the rear part, A', being rigid, and provided with a cross-head, B, having on its ends forward-projecting lugs $a$, and the front part, C, being provided with a cross-head, $c$, pivoted at both ends to the lugs $a$ on the stationary cross-head, and thus hinged between them in such a manner that the head H of the tool-blade may be inserted between the two cross-heads B and $c$, and clamped firmly by closing the hinged front part, C, upon the rear part, A'. The two parts are then kept closed together and the blade rigid upon the handle by slipping or screwing a ferrule, D, over the upper end of the joint, at which latter the handle may be threaded for that purpose, as seen in the drawings, in order to fit in threads in the ferrule.

To further increase the rigidity of the fastening against lateral strain, the head of the tool-blade H is provided at its upper edge with a projecting shoulder, $h$, which, when the blade is clamped, fits into a corresponding recess, $c'$, in the rear of the hinged part C of the handle, as shown in Fig. 2.

E is the hand-bail, provided with the threaded socket $e$, by which it is screwed upon the threaded upper end of the handle A. F is an extension, made of wood, and provided with a threaded metallic socket, $f$, of the same size as the socket $e$, to adapt it to be attached on the handle A, to lengthen the same, after removing the bail E.

The blade G, Fig. 1, is specially designed for use on railroads, to dig out ties too close together for access by the regular spade, being made with side edges converging toward a narrow cutting-edge.

Having thus described my invention, I claim as new and desire to secure by Letters Patent—

A tool-handle, A, divided along its center line in two parts, A' C, provided with cross-heads B $c$, one of which, $c$, is hinged between lugs $a$ on the other, B, to clamp between them the head H of a tool-blade, the two parts A' C being kept clamped together by the ferrule D, movable upon the handle A, substantially as shown and described, and for the purpose set forth.

JAMES PATRICK McCANN.

Witnesses:
 PATRICK HAMILTON,
 E. W. DUNCAN,
 CHARLES A. HAMILTON.